(12) United States Patent
Ackerman et al.

(10) Patent No.: US 8,130,772 B2
(45) Date of Patent: Mar. 6, 2012

(54) ELECTRONIC COMMUNICATIONS RECORDING SYSTEM

(75) Inventors: Marthinus Casper Ackerman, Western Cape (ZA); Grant Alan Broomhall, Western Cape (ZA); Frederik Grobler, Western Cape (ZA)

(73) Assignee: Vastech SA (Pty) Limited, Lynnwood (ZA)

( * ) Notice: Subject to any disclaimer, the term of this patent is extended or adjusted under 35 U.S.C. 154(b) by 133 days.

(21) Appl. No.: 12/223,102

(22) PCT Filed: Jan. 25, 2007

(86) PCT No.: PCT/IB2007/050255
§ 371 (c)(1),
(2), (4) Date: Jul. 21, 2010

(87) PCT Pub. No.: WO2007/086017
PCT Pub. Date: Aug. 2, 2007

(65) Prior Publication Data
US 2010/0278186 A1 Nov. 4, 2010

(30) Foreign Application Priority Data

Jan. 25, 2006 (ZA) .................................. 2006/00715
Jul. 3, 2006 (ZA) .................................. 2006/05515

(51) Int. Cl.
*H04L 12/28* (2006.01)
(52) U.S. Cl. ........................................ 370/401; 370/466
(58) Field of Classification Search ........... 370/465–468
See application file for complete search history.

(56) References Cited

U.S. PATENT DOCUMENTS

| 7,289,538 B1 * | 10/2007 | Paradise et al. .................. 370/497 |
| 7,672,284 B2 * | 3/2010 | Sugar et al. .................... 370/338 |
| 7,853,714 B1 * | 12/2010 | Moberg et al. .................. 709/238 |
| 2003/0028634 A1 * | 2/2003 | Oshizawa ........................ 709/224 |

FOREIGN PATENT DOCUMENTS

| WO | 00/42742 | 7/2000 |
| WO | 02/091675 | 11/2002 |

OTHER PUBLICATIONS

International Search Report for PCT/IB2007/050255, mailed May 9, 2007.
International Preliminary Report on Patentability for PCT/IB2007/050255, 5 pages, (Mar. 13, 2008).

* cited by examiner

*Primary Examiner* — Ayaz Sheikh
*Assistant Examiner* — Mounir Moutaouakil
(74) *Attorney, Agent, or Firm* — Nixon & Vanderhye PC (57) ABSTRACT

An electronic communications recording system (20) comprises a packet data network (PDN) (22) configured to support a PDN protocol. A gateway (24) comprises at least one gateway input port which is connectable to a respective one of at least one communications carrier (No to Nn) carrying data relating to a plurality of communications events according to a respective carrier protocol type; and at least one PDN port connected to the PDN. The gateway is configured to translate data at said at least one input port from the respective carrier protocol type to PDN data in the PDN protocol. At least one communications event analyzer (26) is connected to the PDN and configured to receive as addressed destination at a service access point (19), translated PDN data associated with at least one predetermined port of said at least one gateway input port, to process the received PDN data and to extract from the received PDN data, communications event data relating to at least one communications event.

18 Claims, 8 Drawing Sheets

ELECTRONIC COMMUNICATIONS RECORDING SYSTEM

This application is the U.S. national phase of International Application No. PCT/IB2007/050255, filed 25 Jan. 2007, which designated the U.S. and claims priority to South Africa Application Nos. 2006/00715, filed 25 Jan. 2006, and 2006/05515, filed 3 Jul. 2006, the entire contents of each of which are hereby incorporated by reference.

INTRODUCTION AND BACKGROUND

This invention relates to an electronic communications recording system and an associated method.

Electronic communications recording systems are known and are typically used for surveillance by intelligence services and law enforcement agencies and more particularly to intercept, monitor and electronically record data relating to communications events associated with target data or numbers on intercepted communication networks. A target number may be a telephone number, internet protocol (IP) address, URL etc. There is also a growing need for commercial communications recording systems in communications carrier networks and by service providers.

In general, the known systems are hardware centric, are therefore prone to becoming obsolete and not sufficiently scalable. The scalability is limited by the capacity of a time division multiplex (TDM) switching matrix forming part of these known systems. The TDM switching matrix serves to switch between a plurality of inputs for synchronous data which inputs are connected to the intercepted networks and a plurality of outputs for synchronous data. Furthermore, the input data is typically received in a first digital transmission format, such as E1, and the output data is also in that format. Each of the outputs is then connected to an input of a dedicated E1 data recorder connected between the respective output and a LAN. A system controller is also connected to the LAN. These known systems are generally intercepted network specific and cannot easily be adapted or integrated to accommodate a plurality of network technology types or carrier protocol types. The physical size, power and cooling requirements of the known systems also present serious capacity constraints.

In recent years, there has been a dramatic increase in traffic on communications networks. The aforementioned known systems do not have the capacity to cope with all of the traffic and therefore only selective recording of some events associated with pre-identified target numbers is made. Such selective recording may not be satisfactory for many applications. More particularly, there is a need to search more comprehensively for intelligence and therefore more powerful and scalable products are required, that would enable recording of much more data than is presently practical and possible. For example, at present, monitoring systems are expected to cope with in excess of 30,000 data channels per city, as well as with emerging technologies, such as voice over internet protocol (VoIP).

OBJECT OF THE INVENTION

Accordingly, it is an object of the present invention to provide a recording system and method with which the applicant believes the aforementioned disadvantages may at least be alleviated.

SUMMARY OF THE INVENTION

According to the invention there is provided an electronic communications recording system comprising:
 a packet data network (PDN) configured to support a PDN protocol;
 at least one gateway comprising at least one gateway input port which is connectable to a respective one of at least one communications carrier carrying data relating to a plurality of communications events according to a respective carrier protocol type; and at least one PDN port connected to the PDN; the gateway being configured to translate data at said at least one input port from the respective carrier protocol type to PDN data in the PDN protocol; and
 at least one communications event processor connected to the PDN and configured to receive as addressed destination translated PDN data associated with at least one predetermined port of said at least one gateway input port, to process the received PDN data and to extract from the received PDN data, communications event data relating to at least one communications event.

The term "communications event" includes within its scope, but is not limited to communications sessions such as a telephone call, facsimile transmission, internet session, e-mail etc and other events such as an SMS or similar message etc.

A "communications carrier" or "communications medium" includes within its scope, but is not limited to a physical conductor, fiber optic cable, wireless link, etc.

A "carrier protocol type" or "data carrier type" includes within its scope, but is not limited to a digital transmission format such as the formats in the Plesiochronous Digital Hierarchy (PDH), for example the E-carrier system (for example E1 ... E5), the formats in the T-carrier system (for example T1 ... ), DSO multiples, Synchronous Digital Hierarchy (SDH), SONET, etc. Each carrier protocol type may support one or more signaling protocol, such as SS7 and SS5.

The term "primary rate carrier" is used to denote the lowest capacity data carrier type in terms of bit rate in the relevant system or hierarchy, for example E1 in the case of the E-carrier system, T1 in the T-carrier system and J1 in the J-carrier system.

The communications event processor may comprise a communications event analyzer and the system may further comprise at least one data storage device connected to the PDN for storing the extracted communications event data.

The at least one gateway may comprise at least a first gateway and a second gateway, the first gateway may be configured to translate data from a first carrier protocol type to PDN data, the second gateway may be configured to translate data from a second carrier protocol type to PDN data, and the first carrier protocol type is different from the second carrier protocol type.

The system may comprise at least one hybrid gateway configured to translate data from at least a third carrier protocol type and a fourth carrier protocol type to PDN data.

The PDN preferably comprises an Ethernet realization and the PDN protocol preferably comprises the known Transmission Control Protocol/Internet Protocol stack (TCP/IP), which is asynchronous.

The at least one communications event processor may comprise at least a first communications event processor connected to the PDN and a second communications event processor connected to the PDN, the first communications event processor may be configured to receive as addressed destination translated PDN data associated with a predetermined first set of said at least one gateway port and the second communications event processor may be configured to receive as addressed destination translated PDN data associated with a predetermined second set of said at least one gateway port.

The first set may be different from the second set. In other embodiments, there may be at least some overlap between the first set and the second set.

At least one external client computer or server executing a client application computer program may be connectable to the PDN via an application server of the system connected to the PDN, to provide access to the data translated by the gateway. The application server may be configured to execute application programs.

Also included within the scope of the present invention is a method of recording communications event data, the method comprising the steps of:
translating data relating to a plurality of communications events and which data is carried on a communications carrier according to a synchronous carrier protocol type to an asynchronous packet data network (PDN) protocol; and
forwarding on a PDN the translated data to a communications event processor as addressed destination.

Still further included within the scope of the present invention is a distributed communications recording system comprising:
a first packet data network (PDN) configured to support a PDN protocol;
at least one gateway comprising at least one gateway input port which is connectable at a first site to a respective one of a first group of at least one communications carrier carrying data relating to a plurality of communications events according to a respective carrier protocol type; and at least one PDN port connected to the PDN; the gateway being configured to translate data at said at least one input port from the respective carrier protocol type to PDN data in the PDN protocol;
at least one communications event processor connected to the PDN and configured to receive as addressed destination translated PDN data associated with at least one predetermined port of said at least one gateway input port, to process the received PDN data and to extract from the received data, first part communications event data relating to at least one communications event;
a second PDN configured to support a PDN protocol;
at least one gateway comprising at least one gateway input port which is connectable at a second remote site to a respective one of a second group of at least one communications carrier carrying second part data relating to said at least one communications event according to a respective carrier protocol type; and at least one PDN port connected to the second PDN, the gateway being configured to translate data at said at least one input port from the respective carrier protocol type to PDN data in the PDN protocol;
at least one communications event processor connected to the second PDN and configured to receive as addressed destination translated PDN data comprising said second part data and to extract the second part data;
a network connecting the first PDN to the second PDN; and
the communications event processor connected to the second PDN being configured to forward via the network to the communications event processor connected to the first PDN as addressed destination, the second part data.

The first group of at least one communications carrier may extend along a first path between a first switch and a second switch and the second group of at least one communications carrier may extend along a second path between the first switch and the second switch.

The first part data may comprise communications event content data and the second part data may comprise signaling data relating to said communications event.

The network may comprise a wide area network (WAN).

Yet further included within the scope of the invention is a method of recording communications event data wherein a first part of the data is carried according to a respective synchronous carrier protocol type on communications carriers extending along a first path and where a second part of the data is carried according to a respective synchronous carrier type on communications carriers extending along a second path, the method comprising the steps of:
at a first site along the first path, translating the first part data to an asynchronous packet data network (PDN) protocol;
making the first part data available to a communications event processor on a first PDN;
at a second site along the second path, translating the second part data to the PDN protocol and making the second part data available on a second PDN; and
forwarding via a network extending between the first PDN and the second PDN the second part data to said processor as addressed destination.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
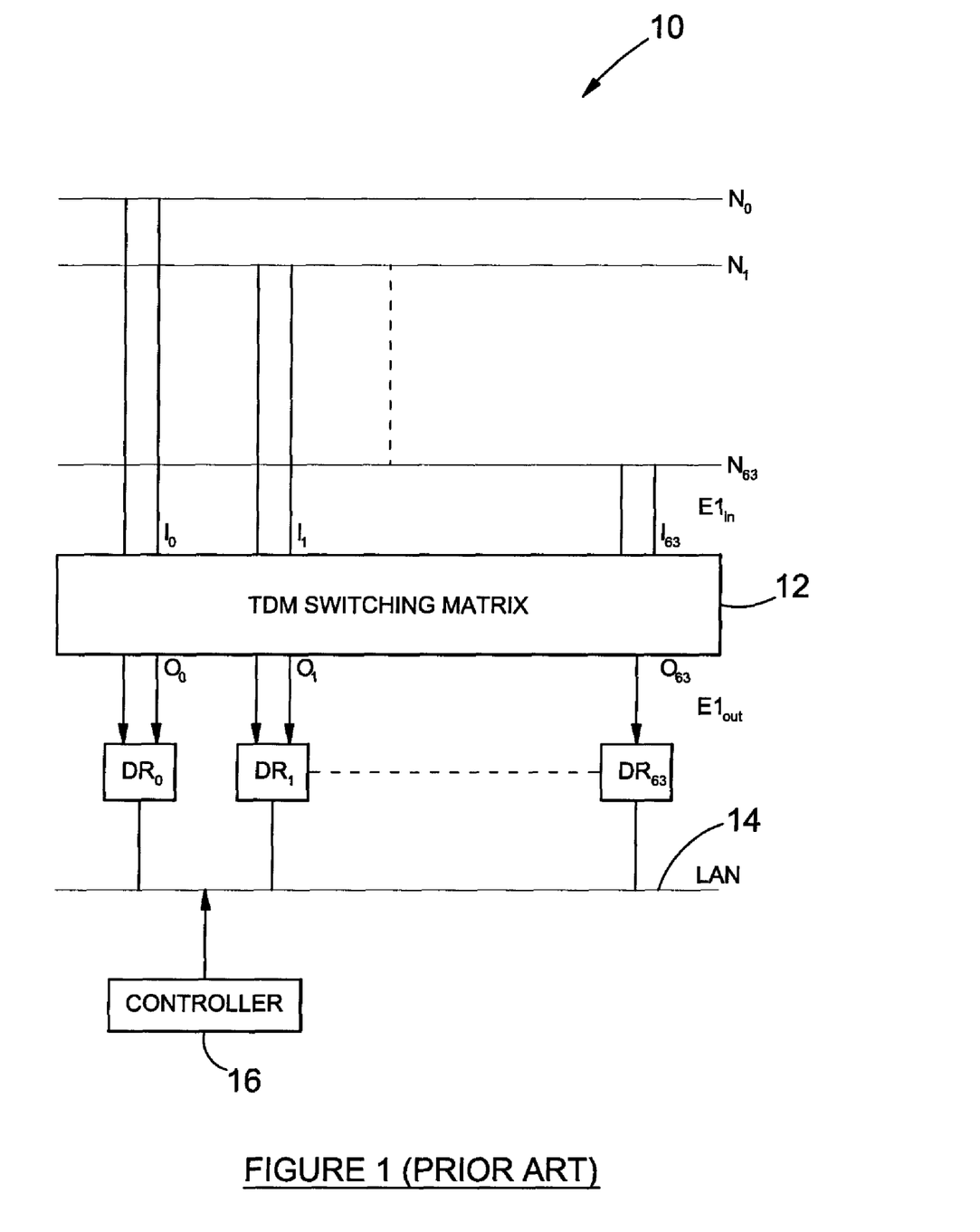
FIG. 1 is a block diagram of part of a typical prior art electronic communications recording system.

A basic block diagram of a typical prior art electronic communications event recording system referred to in the introduction of this specification is generally designated by the reference numeral 10 in FIG. 1.

The system 10 comprises a time division multiplex (TDM) switching matrix 12 which serves to switch between a plurality of inputs $I_0$ to $I_{83}$ for synchronous data which inputs are connected to intercepted networks $N_1$ to $N_{63}$ and a plurality of outputs $O_0$ to $O_{63}$ for synchronous data. The input data is typically received in a first data carrier type, such as E1, and the output data is also in that format. Each of the outputs is then connected to an input of a dedicated E1 data recorder $DR_0$ to $DR_{83}$ connected between a respective output of the TDM switching matrix and a local area network (LAN) 14. A controller 16 is also connected to the LAN. These known systems suffer from the disadvantages set out in the introduction of this specification, namely that they are not sufficiently scalable, are generally intercepted network specific and cannot easily be adapted or integrated to accommodate a plurality of network technology types and carrier protocol types. Their physical size, power and cooling requirements also present problems.

Figure 2:
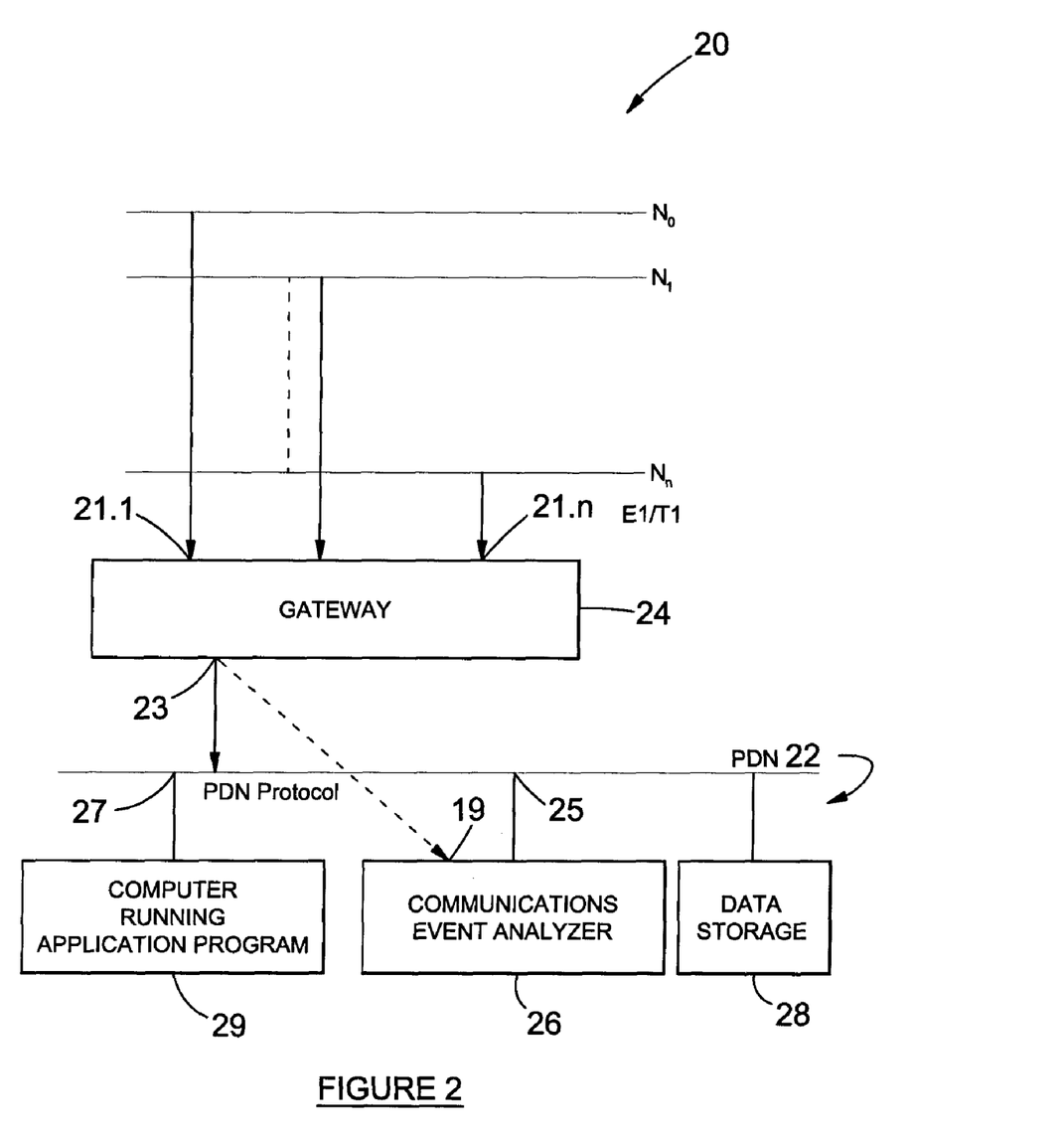
FIG. 2 is a high-level block diagram of the basic architecture of an electronic communications recording system according to the invention.

A high level block diagram of the basic architecture of the system according to the invention is generally designated by the reference numeral 20 in FIG. 2. The system 20 is connectable to at least one communications carrier or medium $N_0$ to $N_n$ of any suitable type carrying data relating to a plurality of communications events according to a respective carrier protocol type. The system 20 comprises an internal or local packet data network (PDN) 22 configured to support a PDN protocol and at least one gateway 24 comprising at least one gateway input port 21.1 to 21.$n$ connected to a respective one of said at least one communications carrier and at least one PDN output port 23 connected to the PDN. The gateway is configured to translate data at said at least one gateway input port from the respective carrier protocol type to the PDN protocol, which is different from the respective carrier protocol type. The system further comprises at least one communications event processor in the form of a communications event analyzer 26 connected to the PDN and configured to receive as addressed destination, typically as a service access point 19 on the PDN, translated PDN data associated with at least one predetermined port 21.1 to 21.$n$, to process the received PDN data and to extract from the received PDN data, communications event data relating to at least one communications event. The system further comprises data storage means 28 connected to the PDN, for storing the extracted communications event data. At least one system computer 29 which is configured to execute support service application programs is connected to the PDN, to further process and analyze the data as will hereinafter be described.

The PDN preferably comprises a switched Ethernet and the PDN protocol is preferably the known Transmission Control Protocol/Internet Protocol stack (TCP/IP), which is asynchronous. The gateway 24 comprises internal buffers (which will be described in more detail hereinafter) for received TDM frames and which buffers are configured to optimize Ethernet throughput according to various parameters.

The PDN data is sent to the communications event analyzer 26 in an addressed PDN IP packet. The IP packet preferably comprises address data comprising an address pair comprising a network address and a transport address relating to service access point 19, which is accessible by the communications event analyzer. Hence, data at predetermined ports 21.1 to 21.$n$ intended for the analyzer 26 are addressed to the service access point 19 and automatically forwarded to the gateway. Accordingly, the communications event analyzer is not required to 'sniff' amongst other data on the PDN for the data that it requires. The required data at the predetermined input ports are addressed and sent by the gateway 24 via the PDN 22 to the communications event analyzer.

During booting up, the communications event analyzer 26 reads from system configuration data, which clear channel or primary rate data streams at inputs 21.1 to 21.$n$, said communications event analyzer is intended and configured to receive. The communications event analyzer is configured to instruct the respective gateway automatically to address and forward to the service access point 19 the data streams. The streams may be addressed to one or more gateways 26.

The computer 29 also communicates with the PDN 22 via a service access point 27.

Figure 3:
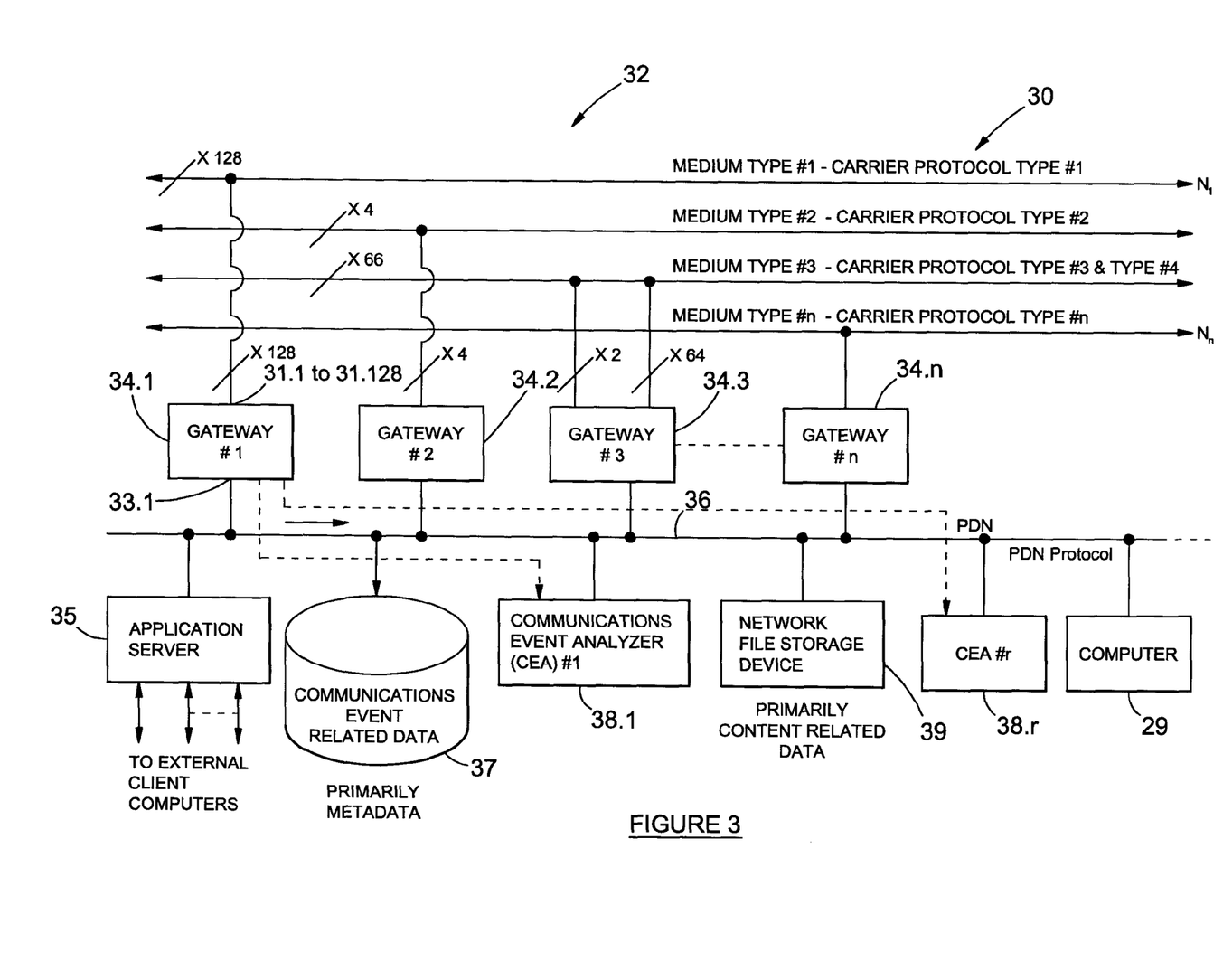
FIG. 3 is a more detailed block diagram of the system according to the invention.

In FIG. 3, there is shown a more detailed block diagram of a system 30 according to the system comprising the aforementioned basic architecture. The system 30 is connectable to a plurality $N_1$ to $N_n$ of communications carriers 32 of external networks to be monitored, comprising communications carriers of any suitable type, such as physical conductors, optical fiber, wireless link etc and carrying data relating to a plurality of communications events according to a respective carrier protocol type. The system comprises a plurality of gateways 34.1 to 34.$n$ connected to the external networks. Each gateway comprises a plurality of input ports 31.1 to 31.128 (in the case of gateway 34.1) connected to respective ones of the communications carriers, and respective outputs connected to the PDN. Also connected to the PDN is at least one communications event analyzer 38.1 to 38.$r$.

As stated hereinbefore, the gateways are configured to translate data at said input ports from the respective carrier protocol type to the PDN protocol. In the event of higher order carrier types (such as E3) encapsulating multiplexed lower order carrier types (such as E1), the higher order carrier types are de-multiplexed to primary rate carrier level, E1, and not there-beyond, or a clear channel intermediate order carrier type, such as E2. Accordingly, different types of gateways are available. The following merely represent examples of gateway types:

- a first gateway type which supports 128 TDM carriers which could be configured to be of a first carrier protocol type, such as E1 or T1. Gateway #1 designated 34.1 in FIG. 3 may be of this type;
- a second gateway type which supports 12 TDM carriers which could be configured to support a second carrier protocol type such as E3 or DS3. Gateway #2 designated 34.2 in FIG. 3 may be of this type;
- a third gateway type which supports at least one external Ethernet port, which is connectable to external Ethernet networks at 10 or 100 or 1000 or 10 000 Mbits;
- a fourth gateway type which supports one or more Synchronous Digital Hierarchy (SDH) protocol ports which are connectable to the external networks, such as Synchronous Transmission Module (STM), such as STM-1 and STM-4;
- a fifth type which supports one or more SONET protocol ports which are connectable to the external networks, such as OC-3; and
- a hybrid type which supports at least third and fourth carrier protocol types. The third and fourth carrier protocol types are preferably different from one another. The third carrier protocol type may be the same as the first, the fourth carrier protocol type may be the same as the second and the third Gateway #3 designated 34.3 in FIG. 3, may be of this type. In other embodiments, the third and fourth carrier protocol types are different from both the first and second carrier protocol types.

Figure 4:
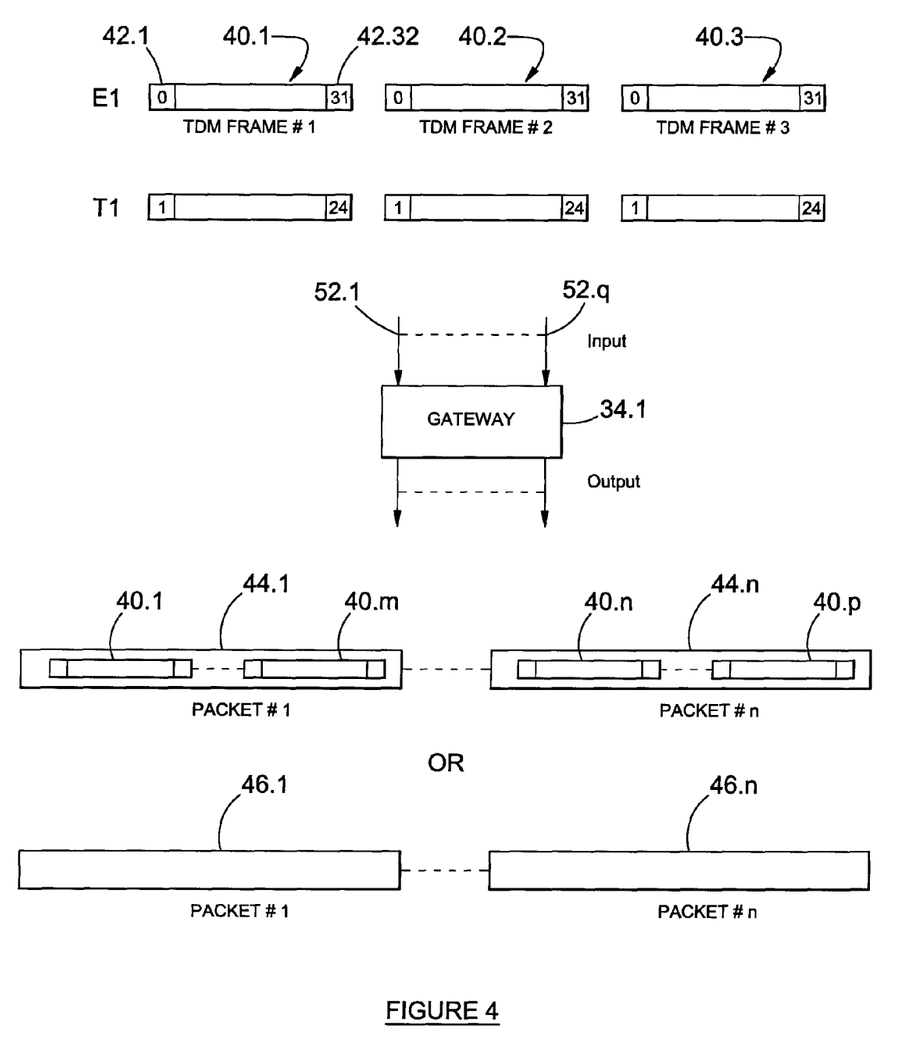
FIG. 4 is a schematic illustration of the translation function of one gateway type forming part of the system according to the invention.

Referring to FIG. 4, and also by way of example, the function of a gateway 34.1 of the aforementioned first type is to translate clear channel or framed TDM data on the input side of the gateway to the packets of the TCP/IP protocol on the PDN or output side of the gateway 34.1. In the figure, there are shown E1 frames 40.1 to 40.3 comprising 32 timeslots 42.1 to 42.32 each. Similarly, the T1 frames comprise 24 timeslots each. The resulting asynchronous PDN packets 44.1 to 44.$n$ each comprises a plurality of TDM frames, or, as shown in the case of packets 46.1 to 46.$n$, clear channel data. The gateway 34.1 receives the E1 and/or T1 frames on a plurality of E1/T1 interfaces. 52.1 to 52.$q$. The gateway then aggregates the frames of each interface separately into respective buffers (not shown in FIG. 4) and which buffers are configured to provide acceptable use of the PDN frame size and acceptable latency in the transfer of data between the E1/T1 side and the PDN side.

Figure 5:
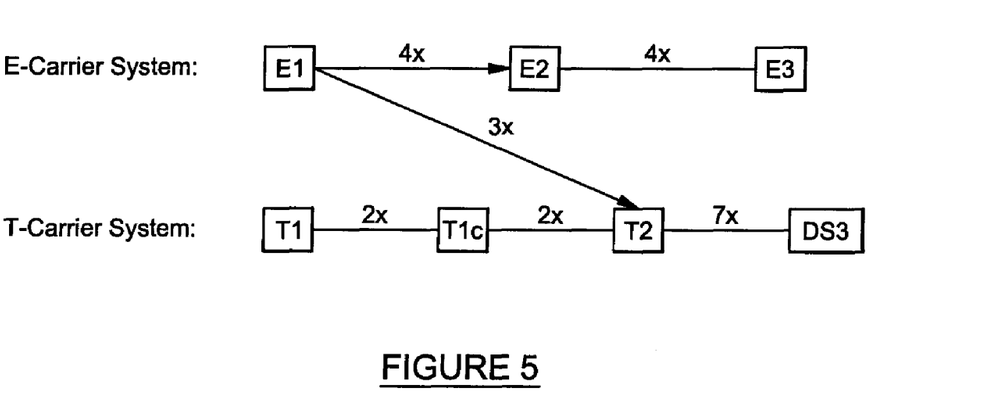
FIG. 5 is a diagrammatic illustration of the multiplexing up of low level E and T data formats to higher level formats.

In FIG. 5 there is shown a self-explanatory diagram of the relationship between various data carrier types in the aforementioned E-carrier system, the T-Carrier system and DS3. The function of the aforementioned second type of gateway is to translate between the clear channel or TDM-framed protocol on the E3 and/or DS3 external network side of the gateway and the asynchronous PDN protocol.

Translated clear channel E3 and DS3 are addressed as aforesaid to respective separate service access points on the PDN accessible by the relevant communications event analyzer. Multiplexed or encapsulated E3 or DS3 are de-multiplexed down to primary rate carriers E1 or T1 or J1 and not there-beyond and then translated to the asynchronous PDN protocol. Each primary carrier format is associated with a separate service access point on the PDN and may be clear channel or TDM.

The hybrid gateway 34.3 in FIG. 3 supports 64 ports for the E1/T1 carrier protocol type and two ports for the E3/DS3 carrier protocol type. The hybrid gateway is configured to translate data from these two protocol types to PDN data and to forward the translated data as aforesaid to suitable service access points on the PDN.

Further connected to the PDN 36 are at least one application server 35, a database 37 for storing communications event related information, primarily event metadata, and a network file storage device 39, for storing primarily event content data. External client computers and application programs access recorded data through the application server 35 only. The reason for forcing external client programs and workstations to access data only through the application server 35, is to enforce security, audit trails and to present the data in a standardized format.

Each communications event analyzer 38.1 to 38.r performs at least some of the following functions:
  connect as hereinbefore described via the PDN to at least one gateway 34.1 to 34.n to receive the translated data;
  from this data, extract
    telephony signalling messages, such as SS7;
    telephony in-band signaling messages, such as SS5;
    content related data such as: data relating to voice sessions, fax transmissions, internet dial-up sessions, SMS messages, etc;
    VoIP signaling and content and other IP content;
  from audio content data extract relevant data, such as data relating to SS7 continuity test tones, fax/modem training tones, DTMF tones, etc; and
  use the extracted data to
    store the metadata relating to communications events, such as data relating to: telephone numbers, time/date, duration, type (voice, fax/data, SMS, etc) in the database 37;
    determine data relating to the beginning and end of session orientated content—such as voice sessions and fax/data transmissions; and
    store the content data, in the network file storage device 39.

The system according to the invention may be configured with as many gateways 34.1 to 34.n and communication event analysers 38.1 to 38.r as are required, to connect to and process the required number of intercepted carriers. It is believed that this architecture is not limited by the constraints of TDM switch matrices and hence may be upscaleable.

More particularly, data at a first set of input ports 31.1 to 31.64 may be addressed and sent as aforesaid to communications event analyzer 38.1 and data at a second set of input ports 31.35 to 35.128 may be addressed and sent to communications event analyzer 38.r, to facilitate scalability. In other applications and for reasons such as operational requirements there may be at least some overlap between the first and second sets.

Figure 6:
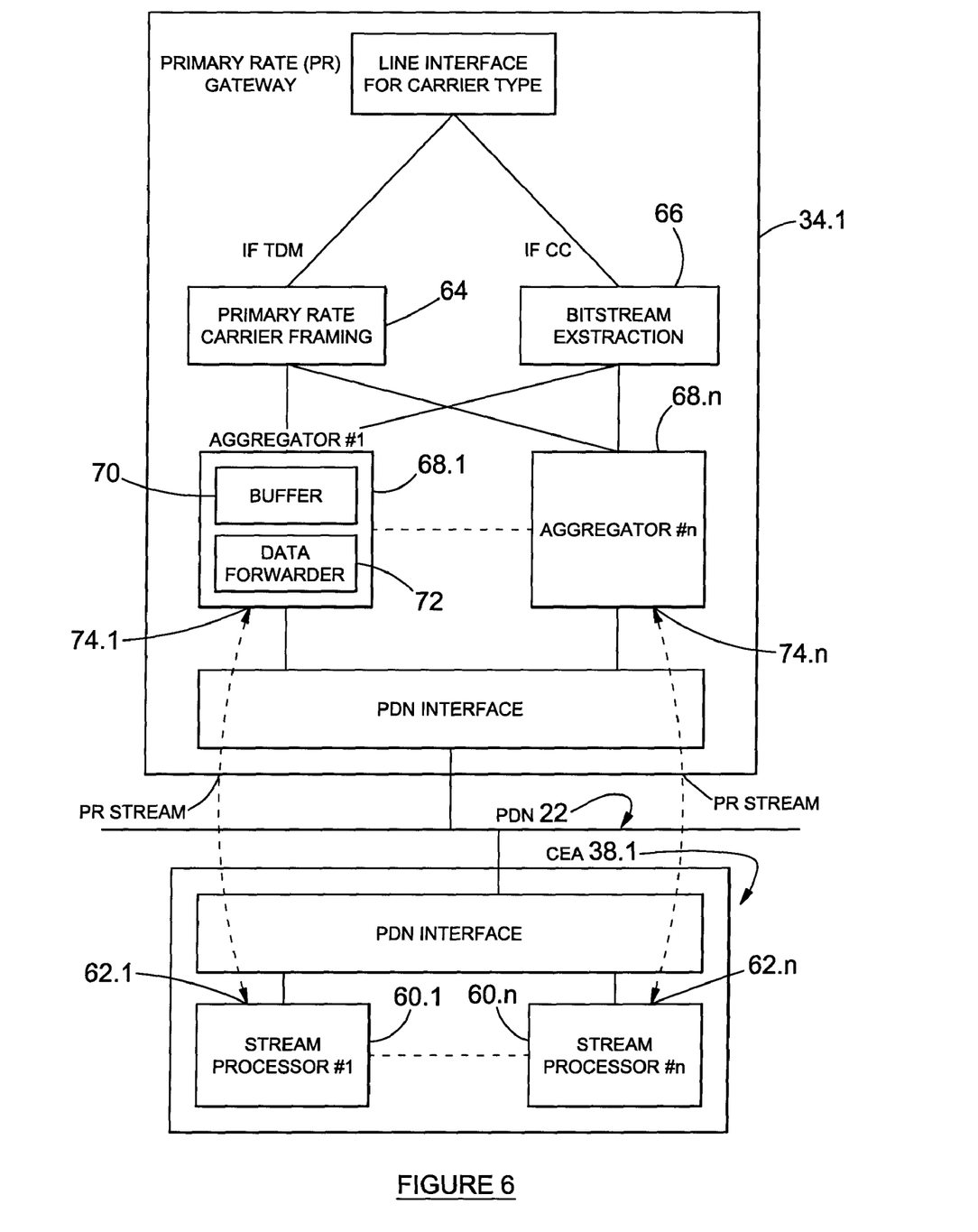
FIG. 6 is a more detailed block diagram of one gateway type which may form part of the system.

In FIG. 6, there is shown a more detailed block diagram of a gateway 34.1 of the aforementioned first kind connected to the PDN 22. Also connected to the PDN is a first communications event analyser 38.1 comprising a plurality of data stream processors 60.1 to 60.n, each associated with a respective service access point 62.1 to 62.n on the PDN. The gateway 34.1 comprises a primary rate carrier framer 64 and a bit stream extractor 66. The framer 64 and extractor 66 are connected to a plurality of data aggregators 68.1 to 68.n. Each aggregator comprises a buffer 70 as hereinbefore described and a data forwarder 72. The data forwarder 72 is configured to forward the data in the associated buffer 70 to a designated service access point 62.1 to 62.n associated with a data stream processor 60.1 to 60.n. Data transfer in the reverse direction is also possible in the same manner.

Figure 7:
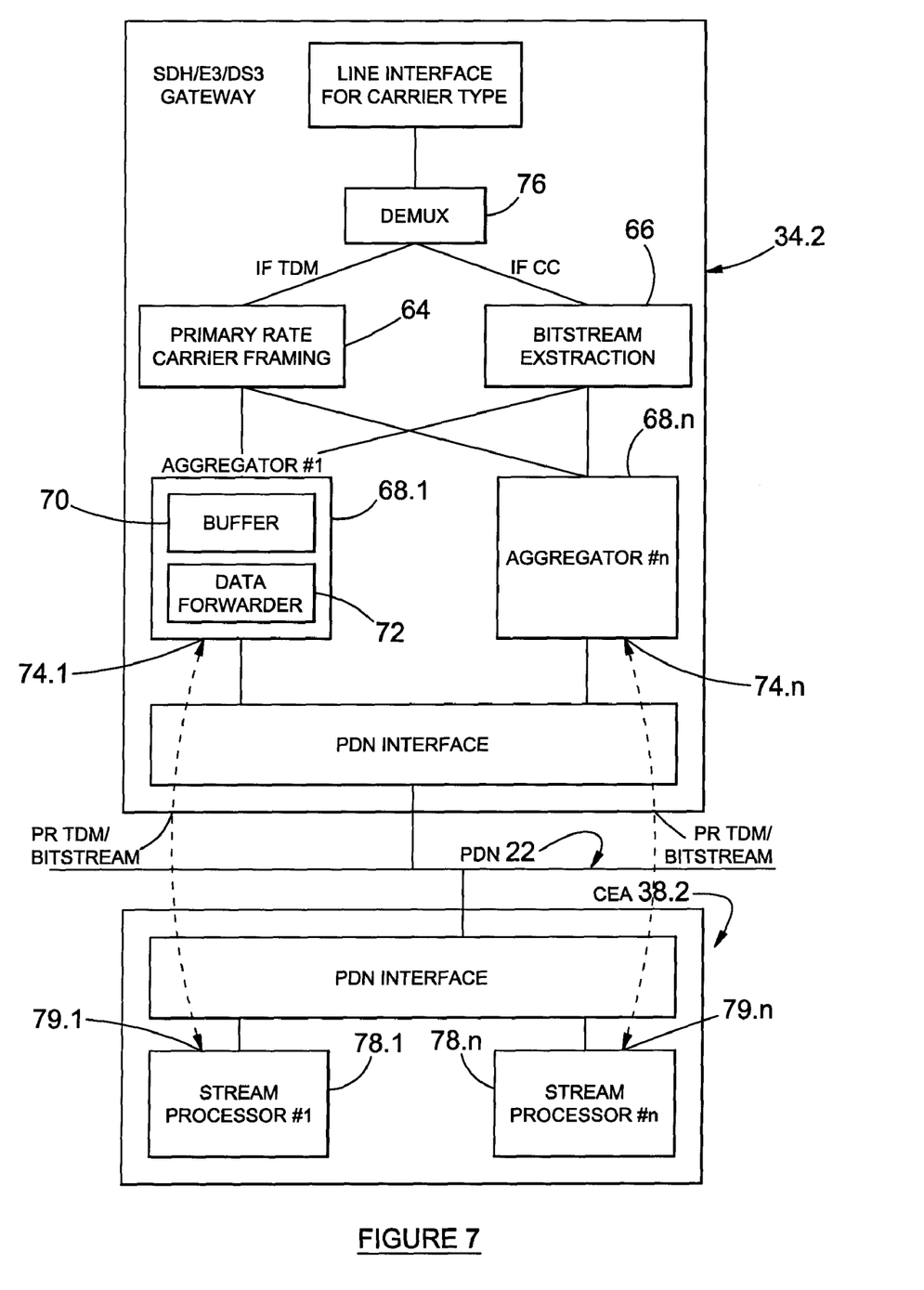
FIG. 7 is a more detailed block diagram of another gateway type which may form part of the system.

The gateway 34.2 shown in FIG. 7 differs from the gateway 34.1 in respect only of the de-multiplexer 76 which is operative to de-multiplex higher order carrier types into constituent primary rate carriers and not there-beyond, so that the data received by the data stream processors of the communication event analysers are either primary rate formatted, alternatively in a higher order carrier type, but clear channel.

A number of other application programs perform services in support of the system 30 and are executed by computers such as computer 29 connected to the PDN 36. These services form part of the system 30 and directly access the recorded data in the database 37 and network file store 39.

The following are examples of important system services:
  depending on the size of the system and the requirement for compression, one or more servers may be configured to compress data relating to recorded voice;
  a storage management service ensures that the database 37 and network file storage device 39 never overflow, by deleting recorded data according to a suitable policy;
  a migration service may be configured to migrate selected data from one system part to another. This allows the system 30 to be distributed geographically;
  a fax demodulation service may be configured automatically to demodulate audio recording containing fax transmissions. The extracted fax images are attached to the respective recorded data. The fax demodulation service is installed on one or more servers according to the performance requirements of the system 30;
  a data demodulation and decoding service may be configured to automatically demodulate dial-up internet sessions and decode the content of the transmissions. The extracted information (such as: email messages, web pages, etc) is attached to the respective recorded data. The data demodulation and decoding service is installed on one or more servers according to the performance requirements of the system 30.

At least some elements or parts (22, 29, 35, 37, 38.1 to 38.r and 39) of the system 30 connected may be distributed over a plurality of geographically distributed sites and interconnected by means of suitable wide area networks (WAN's) and appropriate routers.

Figure 8:
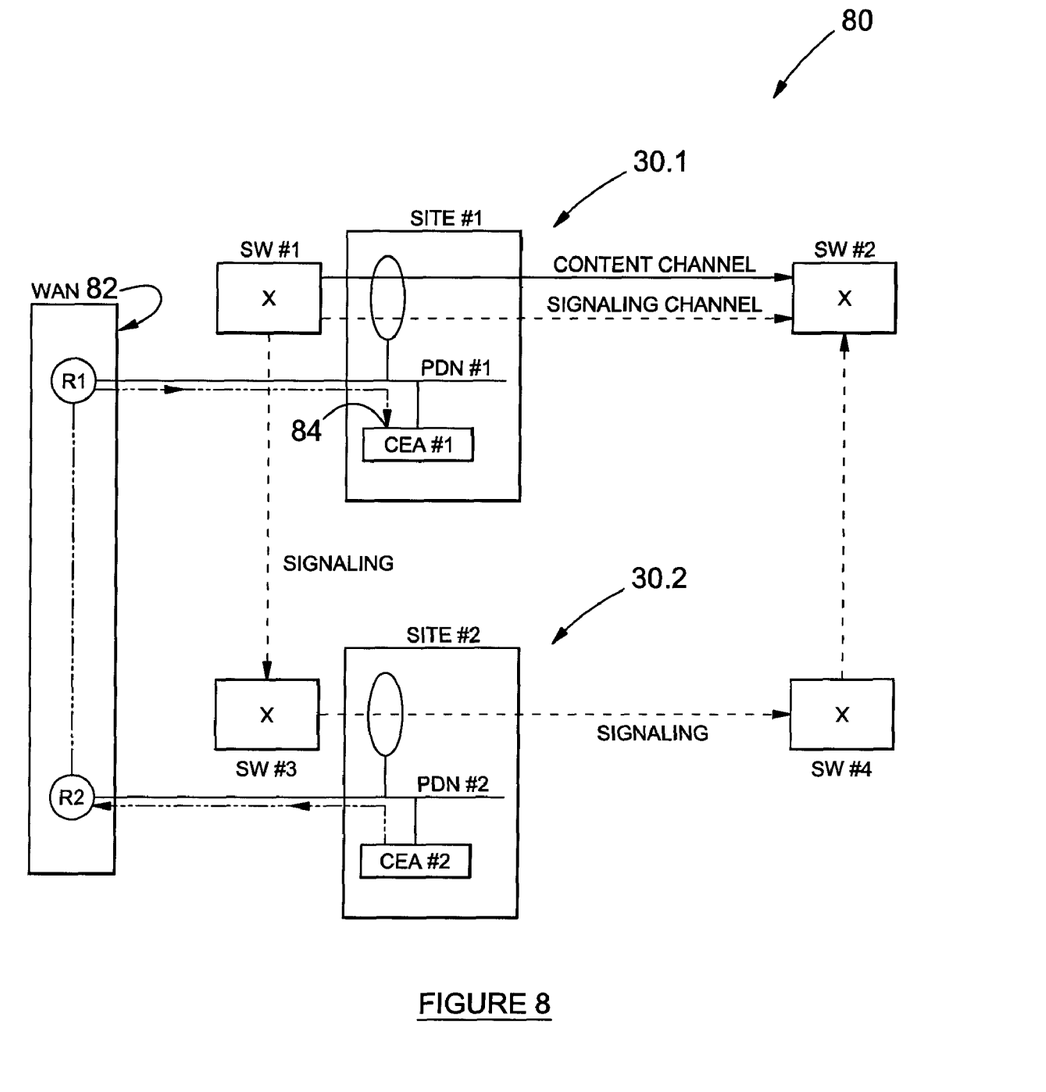
FIG. 8 is a block diagram of a system according to the invention which is geographically distributed.

It will be appreciated that the system may comprise a plurality of modules each comprising the aforementioned basic architecture and that the modules may geographically be distributed and interconnected by suitable networks, such as wide area networks (WAN's). More particularly, in FIG. 8 there is shown a system 80 distributed over first and second sites, site #1 and site #2. The system 80 is deployed to record data relating to communications events in a situation wherein content or first part data and signaling or second part data are not routed through the same switches. For example, the content data of interest may all be provided along a first path between a first switch, switch #1 and a second switch, switch #2. Part of the associated data may also be routed between switch #1 and switch #2, but the balance of the signaling data be routed along a second path through switch #3 and switch #4, to switch #2. A first communications recording system 30.1 as hereinbefore described is deployed at site #1 and comprises the necessary gateways connected to the communications carriers to be monitored and to a first packet data network, PDN #1. Connected to PDN #1 is a first communications event analyzer CEA #1 of the kind hereinbefore described. A second communications recording system 30.2 as hereinbefore described is deployed at site #2 and comprises the necessary gateways connected to the communications carriers to be monitored and to a second PDN #2. Connected to PDN #2 is a second communications event analyzer CEA #2 of the kind hereinbefore described. PDN #1 is connected to PDN #2 by respective routers R1 and R2 and a WAN 82. CEA #2 is configured to extract from data obtained at site #2 from the communications carriers between switch #3 and switch #4 the signaling data relating to the content data on the communications carriers between switch #1 and switch #2. CEA #2 is further configured to address and automatically to forward in real time the signaling data via the PDN's and the WAN to a service access point 84 associated with CEA #1. CEA #1 is configured to utilize the received signaling data to extract and process the associated content data and to cause the data to be stored in real time. Hence, signaling data may be intercepted and captured at a remote site (site #2) and then forwarded or relayed in real time to another site (site #1) hosting a CEA requiring that data, to process other data.

The invention claimed is:

1. An electronic communications recording system comprising:
    a packet data network (PDN) configured to support a PDN protocol;
    at least one gateway comprising at least one gateway input port which is connectable to a respective one of at least one communications carrier carrying data relating to a plurality of communications events according to a respective synchronous carrier protocol type; and at least one PDN port connected to the PDN; the gateway being configured to translate data at said at least one input port from the respective carrier protocol type to PDN data in the PDN protocol;
    at least a first communications event processor connected to the PDN and a second communications event processor connected to the PDN, wherein the first communications event processor is configured to receive as addressed destination translated PDN data associated with a predetermined first set of said at least one gateway port and wherein the second communications event processor is configured to receive as addressed destination translated PDN data associated with a predetermined second set of said at least one gateway port;
    at least one of the first communications event processor and the second communications event processor being configured to process the received PDN data and to extract from the received PDN data, communications event data relating to at least one communications event; and
    a data storage device connected to the PDN for storing the extracted communications event data.

2. A system as claimed in claim 1 wherein the at least one gateway comprises at least a first and a second gateway, wherein the first gateway is configured to translate data from a first carrier protocol type to PDN data, wherein the second gateway is configured to translate data from a second carrier protocol type to PDN data, and wherein the first carrier protocol type is different from the second carrier protocol type.

3. A recording system as claimed in claim 1 comprising at least one hybrid gateway configured to translate data from at least a third carrier protocol type and a fourth carrier protocol type to PDN data.

4. A recording system as claimed in claim 1 wherein the PDN comprises an Ethernet.

5. A recording system as claimed in claim 1 wherein the PDN protocol is different from the respective carrier protocol.

6. A recording system as claimed in claim 1 wherein the PDN protocol comprises the Transmission Control Protocol/Internet Protocol (TCP/IP).

7. A system as claimed in claim 1 wherein the first set is different from the second set.

8. A system as claimed in claim 1 wherein there is at least some overlap between the first set and the second set.

9. A recording system as claimed in claim 1 wherein at least one external client computer executing a client application computer program is connectable to the PDN via an application server connected to the PDN, to access the data translated by the gateway.

10. A method of recording communications event data, the method comprising the steps of:
    translating data relating to a plurality of communications events and which data is carried on at least one communications carrier according to a synchronous carrier protocol type to PDN data in an asynchronous packet data network (PDN) protocol;
    forwarding on a PDN to at least a first communications event processor connected to the PDN as addressed destination translated PDN data associated with a predetermined first set of said at least one communications carrier and to a second communications event processor connected to the PDN as addressed destination translated PDN data associated with a predetermined second set of said at least one communications carrier;
    at least at the first communications event processor, processing the received PDN data and extracting from the received PDN data, communications event data relating to at least one communications event; and
    storing the extracted communications event data in a data storage device.

11. A distributed communications recording system comprising:
    a first packet data network (PDN) configured to support a PDN protocol;
    at least one primaryy gateway comprising at least one gateway input port which is connectable at a first site to a respective one of a first group of at least one communications carrier carrying first part data relating to at least one communications events according to a respective carrier protocol type; and at least one PDN port connected to the PDN; the at least one primary gateway being configured to translate data at said at least one primary gateway input port from the respective carrier protocol type to PDN data in the PDN protocol;
    at least one primary communications event processor connected to the first PDN and configured to receive as addressed destination the translated PDN data at said at least one primary gateway input port;
    a second PDN configured to support a PDN protocol;

at least one secondary gateway comprising at least one gateway input port which is connectable at a second remote site to a respective one of a second group of at least one communications carrier carrying second part data relating to said at least one communications event according to a respective carrier protocol type; and at least one PDN port connected to the second PDN, the at least one secondary gateway being configured to translate data at said at least one secondary gateway input port from the respective carrier protocol type to PDN data in the PDN protocol;

at least one secondary communications event processor connected to the second PDN and configured to receive as addressed destination the translated PDN data at the at least one secondary gateway port;

a connecting network connecting the first PDN to the second PDN;

the at least one primary communications event processor being configured to forward via the connecting network to the at least one primary communications event processor as addressed destination, said second part data; and the at least one primary communications event processor being configured to use the forwarded second part data to extract from the translated PDN data at said at least one primary gateway input port the first part data relating to said communications event and to store the first party data in a data storage device.

12. A distributed communication system as claimed in claim 11 wherein the first group of at least one communications carrier extends along a first path between a first switch and a second switch and wherein the second group of at least one communications carrier extends along a second path between the first switch and the second switch.

13. A distributed communications system as claimed in claim 11 wherein the first part data comprises communications event content data and the second part data comprises signaling data relating to said communications event.

14. A distributed communications system as claimed in claim 11 wherein the connecting network comprises a wide area network (WAN).

15. A method of recording communications event data relating to at least one of a plurality of communication events wherein a first part of the data relating to the at least one event is carried according to a respective synchronous carrier protocol type on communications carriers extending along a first path and where a second part of the data relating to the at least one event is carried according to a respective synchronous carrier type on communications carriers extending along a second path, the method comprising the steps of:
  at a first site along the first path, translating the data carried along the first path to an asynchronous packet data network (PDN) protocol;
  making the translated first path data available to a primary communications event processor on a first PDN;
  at a second site along the second path, translating the data carried along the second path to an asynchronous PDN protocol and making the translated second path data available on a second PDN; and
  forwarding via a connecting network extending between the first PDN and the second PDN the second part data relating to the at least one communications event to said primary processor as addressed destination
  at the primary communications event processor, utilizing the forwarded second part data to extract the first part data from the translated first path data; and
  storing the first part data.

16. A method as claimed in claim 15 wherein first part data comprises communications event content data and the second part data comprises signaling data relating to said communications event.

17. A distributed communications recording system comprising:
  a first packet data network (PDN) configured to support a PDN protocol;
  at least one primary gateway comprising at least one gateway input port which is connectable at a first site to a respective one of a first group of at least one communications carrier extending along a first path between a first switch and a second switch and carrying first part data relating to a plurality of communications events according to a respective carrier protocol type; and at least one PDN port connected to the PDN; the gateway being configured to translate data at said at least one primary gateway input port from the respective carrier protocol type to PDN data in the PDN protocol;
  at least one primary communications event processor connected to the first PDN and configured to receive as addressed destination the translated PDN data at said at least one primary gateway input port, to, process the received PDN data and to extract from the received data, first part communications event data relating to at least one communications event;
  a second PDN configured to support a PDN protocol;
  at least one secondary gateway comprising at least one gateway input port which is connectable at a second remote site to a respective one of a second group of at least one communications carrier extending along a second path between the first switch and the second switch and carrying second part data relating to said at least one communications event according to a respective carrier protocol type; and at least one PDN port connected to the second PDN, the at least one secondary gateway being configured to translate data at said at least one secondary gateway input port from the respective carrier protocol type to PDN data in the PDN protocol;
  at least one secondary communications event processor connected to the second PDN and configured to receive as addressed destination the translated PDN data at the at least one secondary gateway port;
  a connecting network connecting the first PDN to the second PDN; and
  the at least one secondary communications event processor being configured to forward via the connecting network to the at least one primary communications event processor as addressed destination, said second part data.

18. A distributed communications system as claimed in claim 17 wherein the first part data comprises communications event content data and the second part data comprises signaling data relating to said communications event.

* * * * *